No. 814,846. PATENTED MAR. 13, 1906.
L. E. HICKOK.
VEHICLE GEAR.
APPLICATION FILED JUNE 7, 1905.

WITNESSES:
Chas. K. Davies.

INVENTOR
L. E. Hickok,
BY F. E. Stebbins.
Attorney

UNITED STATES PATENT OFFICE.

LESTER E. HICKOK, OF MECHANICSBURG, PENNSYLVANIA.

VEHICLE-GEAR.

No. 814,846.　　　　　　Specification of Letters Patent.　　　Patented March 13, 1906.

Application filed June 7, 1905. Serial No. 264,095.

*To all whom it may concern:*

Be it known that I, LESTER E. HICKOK, a citizen of the United States, residing at Mechanicsburg, in the county of Cumberland and State of Pennsylvania, have invented new and useful Improvements in Vehicle-Gears, of which the following is a specification.

The object of my invention is the provision of a vehicle-gear which shall be so constructed that parts thereof may easily and quickly be removed and other parts substituted, thus facilitating repairs, which shall have the reach iron or strap extended to the head-block and detachably united to the head-block plate, thus avoiding the necessity of welding the parts together, and which shall possess other desirable features of construction constituting the same a superior means for performing the requisite functions.

My invention consists in certain novelties of construction and combinations of parts, as hereinafter set forth and claimed.

The accompanying drawings illustrate an example of the physical embodiment of my invention.

Figure 1:
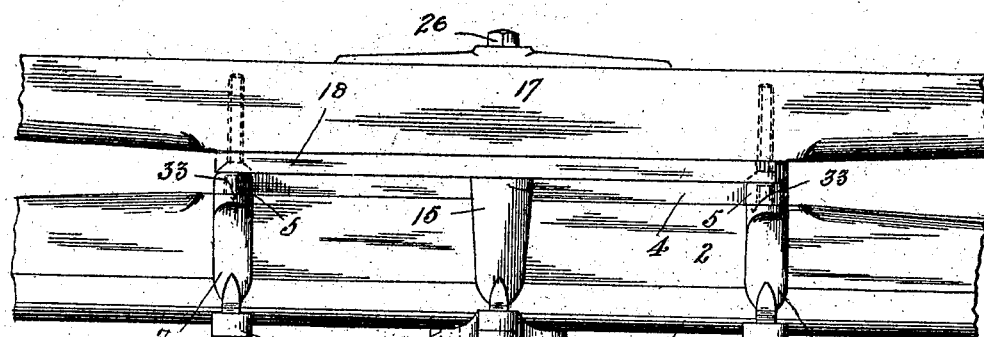
Figure 2:
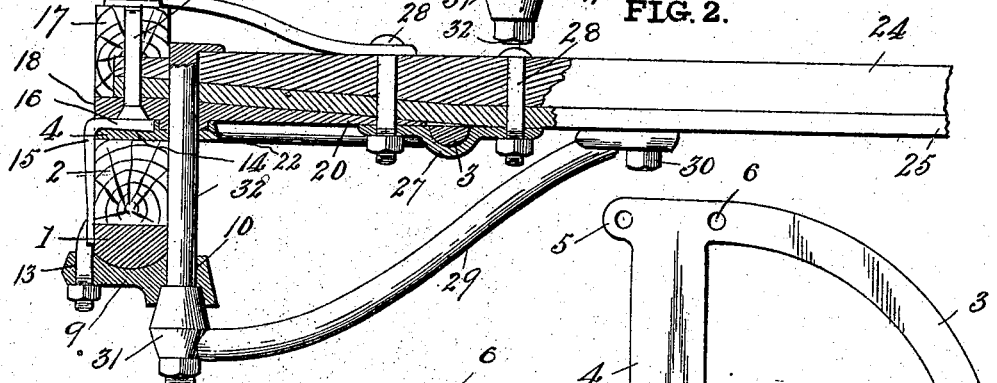
Figures 4, 5:
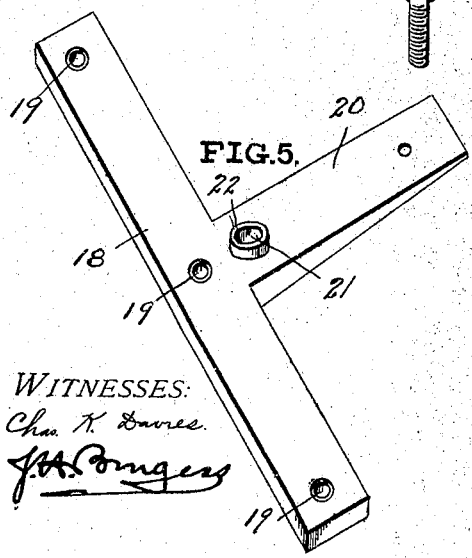
Figure 3:
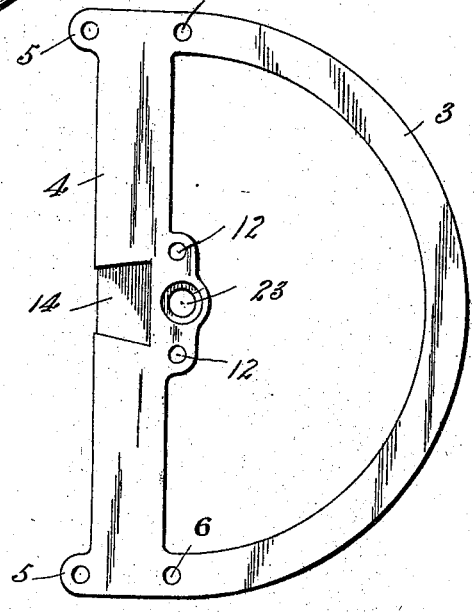

Figure 1 is a front view in elevation of the axle, axle-bed, fifth-wheel plate, head-block plate, and head-block, the front clip-bolts and yokes, which unite the fifth-wheel plate to the axle and axle-bed, also being illustrated. Fig. 2 is a partial cross-section of Fig. 1. Fig. 3 is a top plan view of the fifth-wheel plate and circle. Fig. 4 shows the clip-bolt. Fig. 5 is a bottom view of the head-block plate and tapered arm.

Referring to the several figures, the numeral 1 designates the axle; 2, the axle-bed; 3, the fifth-wheel circle; 4, the fifth-wheel plate; 5, lugs with threaded holes, said lugs being located at the front edge and ends of the plate; 6, the rear threaded holes in the plate; 7, the clip-bolts with threaded ends, only two of which are shown in Fig. 1, those on the opposite side of the axle and axle-bed being of identical construction; 8, the clip-yokes; 9, the axle-yoke provided with a seat for the axle and with suitable holes for the passage of bolts; 10, a hole for the passage of the king-bolt; 11, holes in the lugs of the yoke for the lower ends of the clip-bolts; 12, threaded holes in the fifth-wheel plate for the reception of the clip-bolts, which are identical in construction with the bolts 7 in Fig. 1 at the ends of the fifth-wheel plate; 13, the front hole in the axle-yoke; 14, a dovetail-shaped seat or recess in the top surface of the fifth-wheel plate; 15, the clip with a threaded bolt end; 16, the dovetail-shaped end of the clip at right angles to the length of the clip and adapted to fit the dovetailed seat 14 in the top surface of the fifth-wheel plate and interlock; 17, the head-block; 18, the head block plate; 19, holes for the bolts which secure the plate to the head-block, the heads of the bolts being countersunk, as shown in Fig. 1 at the left, or screws in lieu of bolts; 20, the tapering arm having its upper surface beveled, as shown; 21, a hole for the king-bolt; 22, a boss which fits the recess 23 at the rear of the fifth-wheel plate and which surrounds the hole therein for the king-bolt; 24, the reach; 25, the reach iron or strap having the end bent upwardly to fit the beveled surface of the arm 20, as shown, the end of said strap being perforated and seated in the head-block; 26, the bolt passed through the head-block plate, reach-iron, reach, and head-block; 27, a clip with a recess to receive the fifth-wheel circle; 28, bolts which pass through the reach, reach strap or iron, the ends of the clip, and the end of the tapering reach-arm 20, as shown; 29, a brace; 30, a bolt which secures the end of the brace to the reach; 31, the brace-head, and 32 the king-bolt.

The several figures of the drawings show very clearly the relative locations of the parts and that the axle, axle-bed, axle-yoke, and fifth-wheel plate and circle can move relatively to the remaining fixed parts of the gear and about the fixed king-bolt as a center.

From the foregoing description it becomes clear that several novel and desirable features of construction are present in the gear. The clip 15 may easily be replaced when necessary. The clip-bolts 7 may be removed and others substituted, and the enlarged upper ends at 33 present ample bearing areas against the lower surfaces of the lugs 5 or the lower surface of the plate to insure very rigid connections and hold the clip-bolts in alinement. The head-block plate with the tapering arm allows the end of the reach iron or strap 25 to be extended into the head-block and form a very strong union of the parts, and there is obviated the necessity of welding the strap to the reach-arm 20, as is the common practice.

In applying my improvements modifications and changes may of course be introduced without constituting substantial departures.

What I claim is—

1. The combination in a vehicle-gear having a fifth-wheel plate with a recess or seat in the surface, of a clip provided with a head which fits the recess and forms an interlocking connection, in substance as set forth.

2. The combination in a vehicle-gear having a fifth-wheel plate and a seat or recess in the top surface, of a clip provided with a head which interlocks with the seat in the said plate and with a bolt end which is secured to the axle-yoke.

3. The combination in a vehicle-gear, of an axle, axle-bed, fifth-wheel plate with lugs having threaded holes, clip-bolts with threaded ends, and yokes; each of said clip-bolts having an enlarged upper end 33, for the purpose specified.

4. The combination in a vehicle-gear, of a head-block; a head-block plate provided with an arm at right angles thereto; a reach; and a reach-iron bolted to the reach and to the arm of the head-block plate; said reach-iron being secured to the head-block.

5. The combination in a vehicle-gear, of a head-block; a head-block plate having an arm with a beveled surface; a reach; and a reach-iron; the said reach-iron being bent upwardly at the end, located above said arm, and secured to the head-block; in substance as set forth.

6. The combination in a vehicle-gear, of an axle; axle-bed; fifth-wheel plate and circle; a head-block; head-block plate; reach; reach-iron; axle-yoke; clips; and king-bolt; said king-bolt being passed through the reach, reach-iron, fifth-wheel plate, and axle-yoke; the fifth-wheel circle being held in place against the reach-iron by a clip; and the front end of the axle-yoke being united to the fifth-wheel plate by a removable clip-bolt.

In testimony whereof I affix my signature in presence of two witnesses.

LESTER E. HICKOK.

Witnesses:
JOHN L. ROBINSON,
ALPHEUS N. LANTZ.